United States Patent
Panczuk et al.

(10) Patent No.: US 7,682,112 B2
(45) Date of Patent: Mar. 23, 2010

(54) PROCESS AND A DEVICE FOR THE MACHINING OF PANELS

(75) Inventors: Rene Panczuk, Coublevie (FR);
Pierre-Yves Foissac, Jarrie (FR)

(73) Assignees: Dufieux Industrie, Echirolles (FR);
Airbus France, Toulouse (FR)

( * ) Notice: Subject to any disclaimer, the term of this patent is extended or adjusted under 35 U.S.C. 154(b) by 0 days.

(21) Appl. No.: 10/576,608

(22) PCT Filed: Oct. 22, 2004

(86) PCT No.: PCT/FR2004/002709

§ 371 (c)(1),
(2), (4) Date: Feb. 28, 2007

(87) PCT Pub. No.: WO2005/046931

PCT Pub. Date: May 26, 2005

(65) Prior Publication Data

US 2007/0274797 A1 Nov. 29, 2007

(30) Foreign Application Priority Data

Oct. 24, 2003 (FR) .................................. 03 12484
Dec. 2, 2003 (FR) .................................. 03 14109

(51) Int. Cl.
*B23C 3/13* (2006.01)
*B23C 3/16* (2006.01)

(52) U.S. Cl. ........................ 409/132; 409/199; 409/238; 409/219; 409/205; 409/216

(58) Field of Classification Search ................. 29/33 R, 29/34 B, 34 R, 26 A, 56.5, 56.6, 243.54, 29/561, 564.1, 564.2, 565; 409/131, 204, 409/205, 207, 208, 210, 211, 132, 199, 238, 409/219, 197, 227, 201, 178, 216, 141, 235; 227/51, 58; 408/87, 1 R, 88, 95, 97, 234, 408/236, 143; 269/266
See application file for complete search history.

(56) References Cited

U.S. PATENT DOCUMENTS 4,885,836 A * 12/1989 Bonomi et al. .............. 29/34 B
4,955,119 A   9/1990 Bonomi et al.
4,967,947 A   11/1990 Sarh (Continued)

FOREIGN PATENT DOCUMENTS

EP          0 338 117           10/1989

(Continued)

*Primary Examiner*—Erica E Cadugan
(74) *Attorney, Agent, or Firm*—Clark & Brody (57) ABSTRACT

A machining tool for machining a panel is arranged in a working area of a machining surface of the panel. A holding element is arranged in a support area located on a holding surface of the panel, opposing the machining surface and on an opposite side in relation to the panel to the working area. The operating machining tool and the holding element are displaced on the panel in a co-coordinated manner according to movement presenting at least one component tangentially to the surface of the panel in such a way as to maintain the opposition of the support area and the working area during the displacement of the tool in order to machine at least a part of the machining surface.

28 Claims, 4 Drawing Sheets

U.S. PATENT DOCUMENTS

| | | | |
|---|---|---|---|
| 4,995,148 A * | 2/1991 | Bonomi et al. | 29/26 A |
| 5,163,793 A * | 11/1992 | Martinez | 409/205 |
| 5,248,074 A * | 9/1993 | Speller et al. | 29/243.54 |
| 5,341,556 A * | 8/1994 | Shubin et al. | 29/559 |
| 5,531,009 A * | 7/1996 | Givler | 29/34 B |
| 5,542,796 A * | 8/1996 | Bratten et al. | 29/897.2 |
| 5,584,621 A | 12/1996 | Bertsche et al. | |
| 5,611,130 A * | 3/1997 | Rummell et al. | 29/34 B |
| 5,687,463 A * | 11/1997 | Michalewski et al. | 29/243.53 |
| 6,029,352 A * | 2/2000 | Nelson | 29/897.2 |
| 6,088,897 A * | 7/2000 | Banks et al. | 29/243.53 |
| 6,092,275 A * | 7/2000 | Kellner et al. | 29/525.06 |
| 6,430,796 B1 * | 8/2002 | Jones et al. | 29/34 B |
| 7,168,898 B2 * | 1/2007 | Hamann | 409/199 |
| 7,507,059 B2 * | 3/2009 | Hamann | 409/132 |
| 2006/0039765 A1 * | 2/2006 | Hamann | 408/87 |

FOREIGN PATENT DOCUMENTS

JP 02147809 A * 6/1990

* cited by examiner

PROCESS AND A DEVICE FOR THE MACHINING OF PANELS

FIELD OF THE INVENTION

The invention concerns the technical area of devices and processes used for the machining of pre-shaped blanks or of panels, such as, for example, the panels used to manufacture aircraft cabins or fuselages.

BACKGROUND OF THE INVENTION

In the aforementioned area, we are familiar with the process of machining pre-shaped panels by electro-erosion to non-developable shapes. Such machining involves masking of the zones that are not to be treated, and then immersion in baths of electrolytic solutions. Thus, effectively, this process allows a localised machining of panels of general non-developable shape, but nevertheless has two major drawbacks.

To begin with, machining by electro-erosion constitutes a significant source of discharges to be processed, to the extent that firstly it is necessary at the end of the machining process to clean the panels by removal of the masking elements and then rinsing followed by recycling of the cleaning solutions as well as of the different electrolytic baths used.

Another disadvantage of machining by electro-erosion concerns the impossibility, with this process, of effecting a machining process involving different areas of depth in a single operation.

In the light of the above disadvantages, and in particular of the cost of processing the polluting discharges from the installations used for machining by electro-erosion, a proposal was put forward for machining by the removal of material from panels of concave or convex or indeed complex shape.

To this end, patent U.S. Pat. No. 5,163,793 proposed the creation of a machining installation that includes a sort of mattress of hydraulic jacks, fitted at their top ends with gripping device mounted on a swivel. The device also includes, on top of the mattress of jacks, a portico which is mobile in horizontal translation and which carries a machining head.

To the extent that each jack is individually adjustable in height, it is thus possible to achieve the securing of panels that are of warped or complex shapes.

It appears however that although such a device actually allowed one to effect machining by the removal of materials from panels with non-developable warped or complex shapes, it could not be used to perform high-precision machining, particularly because of its inability to guarantee adequately rigid securing of the panel to be machined.

Thus, the need has arisen for a new machining process, and for a device for the implementation of this machining process that allows one to perform a variety of machining operations and, in particular, machining by the removal of material, while still providing better working accuracy than the processes and devices of previous designs, and also allowing a significant reduction in the polluting discharges.

BRIEF SUMMARY OF THE INVENTION

In order to attain these objectives, the invention concerns a machining process for a panel, that includes:
the positioning of at least one machining tool at the working area of a face, called the machining face, of the panel,
the positioning of at least one retention element at a support area located, firstly, at a face, known as the retention face, of the panel, opposite to the machining face and, secondly, opposite to the working area in relation to the panel,
a coordinated movement, at the level of the panel and with a movement of the machining tool in operation and of the retention element, that has at least one component which is tangential to the surface of the panel, so as to preserve the opposition of the working and support areas during the movement, in order to machine at least part of the machining face.

Advantageously, the coordinated movement of the machining tool in operation and of the retention element, allows one to achieve continuous machining of the panel over an extended area greater than the working area of the tool, with considerable precision.

According to the invention, the retention element can act in different ways on the support area at the retention face of the panel. Thus, according to the invention, the retention element can direct a stream of fluid under pressure, such as water for example or indeed of compressed air, at the support area, in order to balance the force of the machining tool at the working area. The use of such a fluid under pressure also enables one to achieve cooling of the machined panel.

According to one characteristic of the invention, the coordinated movements of the tool and of the retention element are performed automatically using an automated process.

According to a preferred but not exclusive form of implementation of the machining process of the invention, the retention element is placed in contact with the panel during the coordinated guidance movement. In a preferred manner, the retention element then applies a support force to the panel in a direction that is perpendicular to the surface of the support area. Furthermore, the retention element will preferably have a punctual or quasi-punctual action on the retention face. This punctual character, in particular but not exclusively in the case of direct contact, then provides very broad freedom of action on complex surfaces.

According to another characteristic of the invention, and in order to avoid a drag on the panel by the machining tool, arrangements can be made for the application of at least one counter-support element at the working face.

According to the invention, the machining tool can be designed to effect different types of machining. Thus, the machining tool can, for example, be designed to effect machining by the projection of material or of particles, allowing one to perform a modification of the surface state of the panel to be machined or, again, a modification of the constraints or stresses on the latter, such as by means of the technique known as "peen-forming" for example, or "forming" by the projection of particles or shot.

In a preferred form for implementation of the machining process of the invention, the machining tool is designed to effect a machining process by the stripping or removal of material, and is provided with a rotation movement on itself, on axis $\Delta$. Such a machining tool can, for example, be designed to what is normally referred to as high-speed machining or "HSM".

According to one characteristic of the invention, the retention element applies to the support area a force in direction $\Delta'$ and, while machining, during the coordinated movement of the machining tool and the support element, axes $\Delta$ and $\Delta'$ are more or less coincident.

According to yet another characteristic of the invention, arrangements are made to provide damping of the machining vibrations at least at the location of the retention element.

According to the invention, the relative movement of the machining tool in operation and of the retention element can be achieved in different ways, such as by using a combination of a movement of the panel associated with movements of the machining tool and of the retention element for example.

According to a preferred form of implementation, the retention element and the machining tool are each moved with at least five degrees of freedom. In such a configuration, it is then possible to assign a fixed position to the panel throughout all of the machining process.

According to one preferred but not necessary characteristic of the invention, the machining tool and the retention element are each moved with three degrees of freedom of movement in translation on axes X, Y, Z and X', Y', Z' respectively, and two degrees of movement in rotation on axes $R_1$, $R_2$, and $R'_1$, $R'_2$ respectively, where $R_1$, $R'_1$ are parallel to axes Y, Y' respectively and $R_2$, $R'_2$ are parallel to planes X, Z, and X', Z' respectively.

According to yet another characteristic of the invention, the panel to be machined is placed on a orientation that is more or less vertical. This placement of the invention then allows one to perform the removal, by gravity, of the particles stripped or removed from the panel during the machining process or, again, to perform easy recovery of any particles projected onto this same panel during the machining process.

Again, according to another characteristic of the invention, the process performs a determination of the actual geometry of the retention face before machining, as well as machining of the panel to a pre-determined machining depth by placing the retention element and the machining tool at a distance corresponding to the predetermined thickness, during the coordinated machining movement.

According to the invention, it is possible to envisage organising the retention of the panel in different ways. Thus, it is possible to envisage that the retention element also contributes to the machining of the panel and, to this end also includes a machining tool.

However, in a preferred form of implementation of the machining process of the invention, the retention element achieves the holding of the retention face of the panel without machining this retention face.

The invention also concerns a device to enable one to implement the machining process of the invention. Thus, the invention concerns a device for the machining of at least one panel, and that includes:
  resources to support the panel, designed to allow simultaneous access to two opposite faces of the panel, known as the working and retention faces,
  resources for the movement of at least one machining tool,
  resources for the movement of at least the retention element,
  a unit to control the resources for movement of the machining tool and of the retention element, this unit being designed to control the movement resources, so as to position the machining tool at a working area of the machining face of the panel, during a machining operation on the panel:
  to position the machining tool at a working area of the machining face of the panel.
  to position the retention element at a contact area located on the retention face and opposite to the working area,
  and to perform a coordinated movement at the panel, and with a movement that has at least one component which is tangential to the surface of the panel of the machining tool in operation and of the retention element, so as to preserve the opposition of the working and support areas during the movement, in order to machine at least part of the machining face of the panel.

According to one characteristic of the invention, the movement resources of the tool and of the retention element each have at least five axes of movement, so as to provide the tool and the retention element with at least five degrees of freedom.

Within the meaning of the invention, such an ability to move the tool and the retention element in relation to the panel to be machined can be provided in different ways, such as by means of two automated arms with six degrees of freedom for example, three degrees of freedom in rotation and three degrees of freedom in translation, where one of the arms carries the machining tool at its extremity, while the other arm carries the retention element.

It is also possible to envisage performing the movement of the tool and of the retention element by means of so-called parallel automated structures.

According to a preferred form of implementation, providing greater simplicity of automation and control, the movement resources of the tool and of the retention element each include three degrees of movement in translation on axes X, Y, Z, and X', Y', Z' respectively, and two degrees of movement in rotation on axes $R_1$, $R_2$ and $R'_1$, $R'_2$ respectively, where $R_1$ and $R'_1$ are parallel to axes Y, Y' respectively, and $R_2$, $R'_2$ are parallel to the planes defined by axes X, Z and X', Z'.

In a preferred form of implementation of the machining device of the invention, the movement resources of the tool then include:
  a beam that is mobile in translation along at least one guidance track on axi X , supported by a chassis and associated with motor resources commanded by the control unit,
  a chariot that is mobile in translation along a guidance track on axis Z, carried by the beam and associated with motor resources that are commanded by the control unit, where axis Z is more or less perpendicular to axis X,
  an arm that is telescopic in translation on axis Y, carried by the chariot and associated with motor resources that are commanded by the control unit, axis Y being more or less perpendicular to the plane defined by axes X, Z,
  a head support designed to fit onto one end of the telescopic arms, and mobile in rotation in relation to the arms on axis $R_1$, parallel to axis Y, and associated with motor resources that are commanded by the control unit,
  a tool-bearing head, designed to fit onto the head support, mobile in rotation in relation to the support on axis $R_2$, perpendicular to axis Y, and associated with motor resources that are commanded by the control unit.

For their part, the movement resources of the retention element include:
  a beam that is mobile in translation along at least one guidance track on axis X', supported by a chassis and associated with motor resources that are commanded by the control unit,
  a chariot that is mobile in translation along a guidance track on axis Z', carried by the beam and associated with motor resources that are commanded by the control unit, with axis Z' being more or less perpendicular to axis X',
  an arm that is telescopic in translation on axis Y', carried by the chariot and associated with motor resources that are commanded by the control unit, axis Y' being more or less perpendicular to the plane defined by axes X', Z',
  a head support designed to fit onto one end of the telescopic arm and mobile in rotation in relation to the arm on axis $R'_1$, parallel to axis Y', and associated with motor resources that are commanded by the control unit,
  a retention-element-carrying head, designed to fit onto the head support and mobile in rotation in relation to the support on axis $R'_2$, perpendicular to axis $Y'$, and associated with motor resources that are commanded by the control unit.

The support resources are then fitted onto the chassis, so as to be interposed between the movement resources of the tool and the movement resources of the retention element.

According to another characteristic of the invention, and in order to provide a solution any control problems:

the support of the tool-bearing head is firstly fitted on a cradle equipping the end of the telescopic arm, and mobile in rotation around axis $R_1$ and, secondly, is mobile in rotation around axis $R_3$, perpendicular to axis $R_1$, in relation to the cradle.

the support of the tool-bearing head is first fitted on a cradle equipping the end of the telescopic arm and mobile in rotation around axis $R'_1$ and, secondly, mobile in rotation around axis $R'_3$, perpendicular to axis $R'_1$, in relation to the cradle.

In a preferred manner, axes X, Z and X', Z' define vertical planes that are more or less parallel, so that the panel has a more or less vertical orientation during the machining process.

According to the invention, the tool-bearing head can be designed so as to receive different types of tools, such as tools for the projection of particles for example, or tools for the removal or stripping of materials. Thus, in a preferred form, the tool-bearing head includes resources for driving the tool in rotation around an axis Δ that is more or less perpendicular to axis $R_2$.

According to another characteristic of the invention, in order to avoid a phenomenon of attraction of the panel by the machining tool, otherwise known as drag, the movement resources include at least one counter-support element on the working face of the panel.

According to yet another characteristic of the invention, in order to perform high-precision machining, the device also includes resources for damping of the machining vibrations.

In a preferred manner, in order to achieve absorption of the machining vibrations as close as possible to their points of production, the damping resources are fitted onto the movement resources of the retention element. Such damping resources can then be composed of systems of hydraulic or hydro-pneumatic dampers for example, supporting the head of the movement resources of the retention element.

According to the invention, the retention element can be achieved in different ways. Thus, the retention element can be composed of a nozzle for the projection of a fluid under pressure for example, or in the form of a slide, made from a material with a low friction coefficient, intended to press against the retention face of the panel and to slide on the latter during the coordinated movement. In a preferred manner, the retention element will act punctually or quasi-punctually on the retention face, this action then, preferably, being more or less perpendicular to the retention face at its point of application.

According to a preferred implementation characteristic, the retention element includes at least one bearing sphere designed to roll on the retention face of the panel during the machining process. In one particularly advantageous method of implementation, the bearing sphere is composed of elastically deformable material, so as to damp the machining vibrations.

According to the invention, the support resources of the panel can be provided in any appropriate manner.

In a preferred form of implementation, the support resources of the panel are removable, so as to allow operation of the machining device concurrently with other operations for example. In fact, during the installation of a panel on the support resources, the device can machine another panel supported by other support resources for example, and thus in an alternating manner.

According to a preferred form of implementation, the support resources include a removable frame that is fitted with resources for the securing of a panel to be machined.

Thus, it is possible to envisage a certain number of such removable frames, allowing optimal use of the device. Likewise, it is possible to envisage different types of frames to match the different forms of panels that are liable to be machined on the device of the invention.

In a preferred form of implementation, the removable frame includes at least one mobile cross-member allowing adjustment of the dimensions of the frame to the dimensions of the panel to be machined.

Diverse other characteristics of the invention emerge from the following description provided with reference to the drawings, which illustrate preferred but not limiting forms of implementation of a machining device for executing the process of the invention.

DETAILED DESCRIPTION OF THE INVENTION

Figure 1:
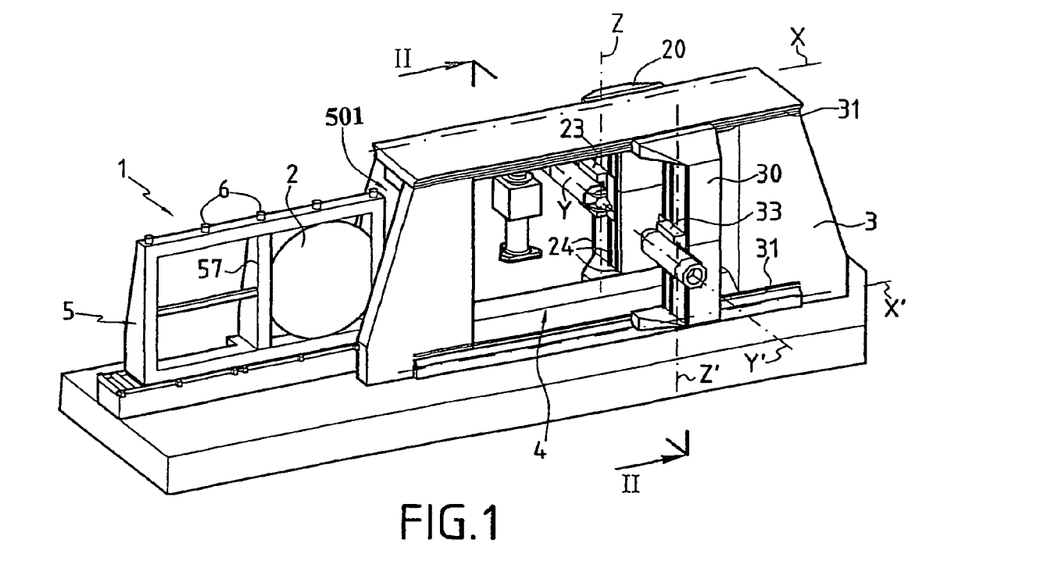
FIG. 1 is a general schematic perspective view of a preferred form of implementation of a machining device of the invention.

A machining device of the invention, as illustrated in FIG. 1 and designated as a whole by reference 1, allows the machining of a panel 2 that is liable to have a generally complex and non-developable shape, such as, convex or concave for example, or again locally convex and locally concave.

In order to perform this machining process, the device 1 includes a chassis 3 which, according to the illustrated example, is made in the form of a sort of portico that is more or less vertical, defining a window 4 inside which the panel to be machined is positioned, being held there by support resources 5. According to the illustrated example, the support resources 5 are made in the form of a removable frame that is capable of being immobilised in the window 4 on the chassis 3 by means of locking resources 6 that can be provided in any appropriate manner.

According to an essential characteristic of the invention, the machining device 1 also includes movement resources 10 for at least one tool and, according to the illustrated example, exactly one machining tool 11, as well as movement resources 12 for at least one, and according to the illustrated example exactly one retention element 13. As shown in particular in FIG. 2, the movement resources 10 and 11 are fitted on either side of the chassis 3, so that the panel 2 is interposed between the machining tool 11 and the retention element 13.

According to the illustrated example, the movement resources 10 for the tool include a beam 20, that is mobile in translation along at least one, and according to the example two guidance tracks 21 on axis X, supported by the chassis 3. Axis X of the guidance tracks 21 than has an orientation that is more or less horizontal.

In a manner that is familiar, as such, to the professional engineer who is a specialist in the design and construction of machines-tools, the beam 20 is associated with motor resources (not shown) and commanded by a control unit 22, whose different functions will be described later, it being understood that the control unit 22 is designed so as to allow automated operation of the machining device 1.

The movement resources 10 of the tool 11 also include a chariot 23 that is mobile in translation along a guidance track 24 on axis Z, carried by the beam 20. According to the illustrated example, axis Z has an orientation that is more or less vertical and perpendicular to axis X, so that axes X and Z define a plane that is also vertical. The chariot 23 is also associated with motor resources (not shown) that provide for its movement along the track 24, being commanded by the control unit 22.

The movement resources 10 also include an arm 25 which is telescopic in translation on axis Y, and which is carried by the chariot 23. According to the illustrated example, translation axis Y is more or less perpendicular to the plane defined by crossed translation axes X and Z of the chariot 23. The telescopic arm is also associated with motor resources (not shown) commanded by the control unit 22.

According to the illustrated example, the telescopic arm 25 is equipped at its end oriented toward the chassis 3 with a head support 26 that is mobile in rotation in relation to the arm 25 along an axis of rotation $R_1$ parallel to axis Y and, according to the example, coincident with this axe Y like the other mobile devices 20, 23 and 25 constituting the movement resources 10, the head support 26 is associated with motor resources (not shown) commanded by the control unit 22.

Finally, the movement resources 10 include a tool-bearing head 27 that is designed to fit onto the head support 26 so as to be mobile in rotation in relation to the support 26 along axis of rotation $R_2$, more or less perpendicular to axis $R_1$. Of course the rotation movement of the head 27 around axis $R_2$ is associated with motor resources (not shown) commanded by the control unit 22.

The configuration, as described above, therefore provides the tool 11, attached to the tool-bearing head 27, with five degrees of freedom, namely three degrees of freedom in translation on axes X, Y, and Z, and two degrees of freedom in rotation on axes $R_1$ and $R_2$.

Figure 2:
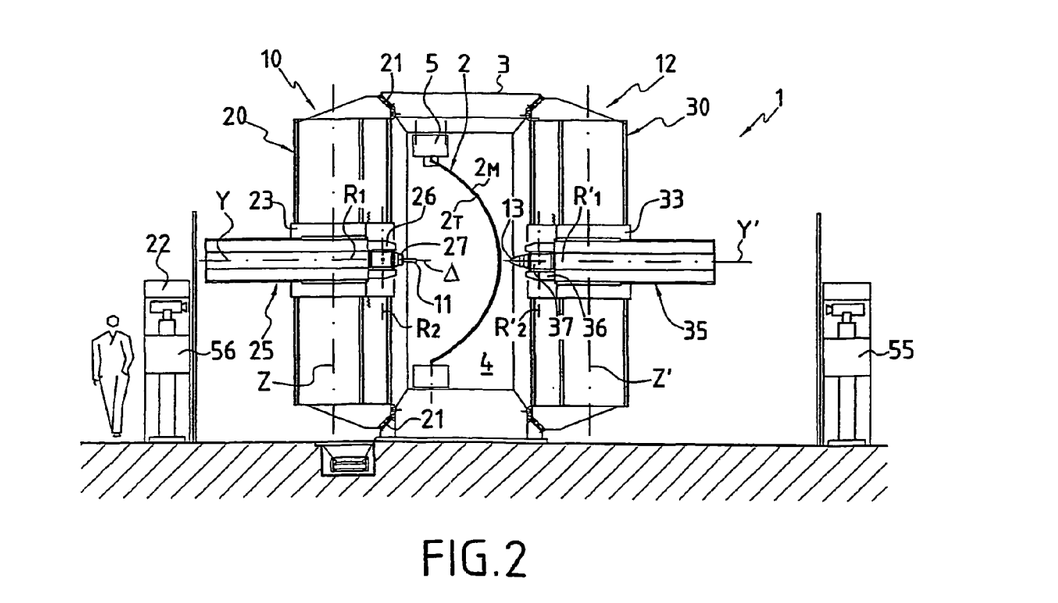
FIG. 2 is a schematic cross section along plane II-II of FIG. 1.

Finally, according to the illustrated example, the tool-bearing head 27 is equipped with motor resources (not shown) used to drive the tool 11 in rotation while machining along axis Δ which, according to the example illustrated in FIG. 2, is more or less coincident with axis Y, to the extent that this figure corresponds to a wait or rest position. Of course in the light of the different degrees of freedom of the head 27, axis Δ can have different orientations while still remaining more or less perpendicular to axis $R_2$. The motor resources for rotation of the tool 11 equipping the head 27 are also commanded by the control unit 22.

Figure 3:
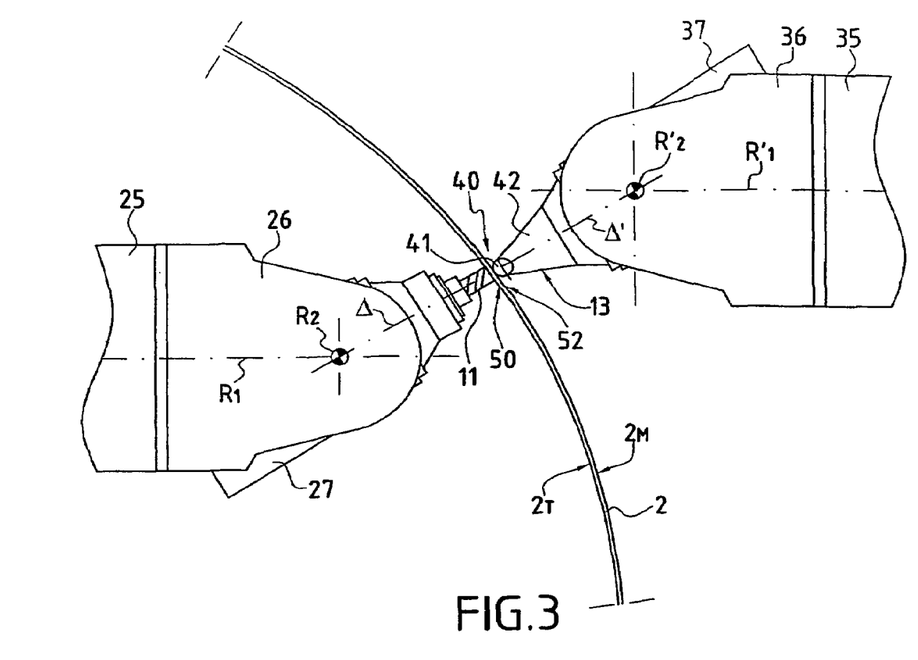
FIG. 3 is an elevation showing a preferred mounting configuration for a machining tool and a retention element during the machining of a panel according to the process of the invention.
Figure 4:
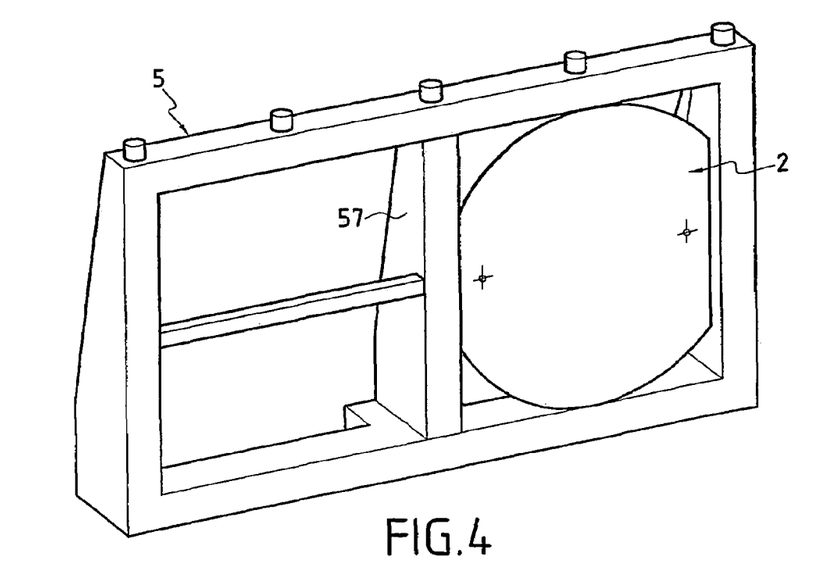
FIG. 4 is a perspective view, on a larger scale, of a preferred but not exclusive form of implementation of support resources for a panel to be machined according to the invention.

According to the invention, the machining tool 11 can be created in different ways and, according to the illustrated example, as shown more particularly by FIG. 3, the tool 11 is made in the form of a milling cutter that is driven in rotation on axis Δ by the motor resources equipping the tool-bearing head 27.

The movement resources 12 of the retention element 13 have a structure that is more or less similar to that of the movement resources 10 of the tool 11.

Thus the movement resources 12 of the retention tool 13 include:

a beam 30 which is mobile in translation along at least one, and according to the example two guidance tracks 31 on axis X, supported by the chassis 3, and which is associated with motor resources (not shown) commanded by the control unit, where axis X' is horizontal, a chariot 33 which is mobile in translation along a guidance track 34 on axis Z', carried by the beam 30 and associated with motor resources (not shown) commanded by the control unit 2, where axis Z' is more or less perpendicular to axis X', an arm 35 that is telescopic in translation on axis Y', carried by the chariot 33 and associated with motor resources (not shown) commanded by the control unit 22, where axis Y' is more or less perpendicular to the plane defined by axes X', Z', a head support 36 designed to fit onto one end of the telescopic arm 35 and mobile in rotation in relation to the arm 35 along axis $R_1$ parallel to axis Y and associated with motor resources (not shown) commanded by the control unit 22, and a retention-element-carrying head 37, designed to fit onto the head support 36 and mobile in rotation in relation to the support 36 along axis $R_2$, perpendicular to axis $R'_1$ and associated with motor resources (not shown) commanded by the control unit 22.

According to the invention, the retention element 13 can be implemented in any appropriate manner and, according to the illustrated example, the retention element 13 has a sphere 41 at one end 40 opposite to the support head 37, intended to exert a more or less intermittent pressure on the panel 2, as will become apparent in what follows. In a preferred manner, the sphere 41 is made from an elastically deformable material, such as a synthetic polymer material or a plastic material for example. The elastic deformation quality of the sphere is then used with advantage to damp the machining vibrations. Of course the sphere could also be made from other materials, such as a metal like steel or other suitable metal alloys for example. According to the illustrated example, the sphere 41 is positioned more or less at the end of a body 42 of tapered shape on axis Δ', more or less perpendicular to axis $R'_2$ for rotation of the support head 37. The sphere 41 is then fitted to the body 42 so as to be able to roll on the panel 2, as will become evident in what follows. In addition, in a preferred manner, the retention element 13 is fitted in a removable manner to the head support 37, so that it can be changed rapidly or, again, replaced by a tool. To this end, in a preferred manner, like head support 27, the head 37 is equipped with resources for rotation of a tool around axe Δ', where these drive resources are commanded by the control resources 22.

The machining device thus constituted is then implemented in the following way. Firstly, a panel 2 is installed in the window 4. To this end, according to the illustrated example, the chassis 3 has a lateral window 501 by which the support resources, composed of the mobile frame 5, are engaged to position the plate 2 between the tool 11 and the retention element 13, as illustrated in FIG. 2. In this state, the frame 5 is then locked onto the chassis 3, so that the panel 2 is totally immobile in relation to the chassis.

Once this arrangement has been completed, and according to an essential characteristic of the invention, the control unit 22 commands the operation of the resources 10 for movement of the tool 11 and the movement resources 12 of the retention element 13, so as to position the tool 11, in operation, in contact with a face $2_T$, called the machining face, of the panel 2 in an area 50 called the working area, as illustrated in FIG. 3. In a more or less similar manner, the control unit 22 commands the operation of the movement resources 12 so as to position the retention element 13, and more particularly the sphere 41, in contact with a face $2_M$, known as the retention face of the panel 2, at a retention area 52 located on the retention face $2_M$ opposite to the machining face $2_T$, this retention area 52 being located opposite to the working area 50 in relation to the panel 2.

Once this positioning has been completed, the unit 22 commands a coordinated movement of the machining tool 11 in operation, and of the retention element 13 in contact with the panel 2, so as to machine, in part at least, the machining face $2_T$ of the panel 2.

According to an essential characteristic of the invention, the control unit performs the coordinated movement of the tool 11 and of the retention element 13 so as to preserve the opposition of the contact area 52 and the working area 50 during this joint movement. During this movement, the sphere 41 then rolls on the retention face $2_M$ of the panel 2. This means that the movement of the tool 11 and of the retention element 13, in relation to the panel, can be broken into components in a plane tangential to, and the plane normal to the surface of the panel in the machining area, and where at least the tangential component is non-zero. The coordinated movement therefore has at least one component that is tangential to the surface of the panel and, at least in certain phases of the machining process, also has a component normal to the surface of the panel, as is the case for the tools during adjustment of the depth of cut in particular.

In a preferred manner, during all of the machining stage on the panel 2, the unit 22 controls these movements so as to preserve firstly the perpendicularity of bearing axis Δ' of the retention element 13 with the surface of the support area 52 and, secondly, the conjugation of axis Δ' and of rotation axis Δ of the tool 11, so that, during the whole period of machining and coordinated movement, axes Δ and Δ' are coincident.

Thus, it is possible, by association of the retention elements and of the machining tool 11, to achieve machining of great precision on the panel 2 without deformation of the latter. The association of the retention element 13 and the machining tool 11, together with the precision capabilities of the numerical-control resources equipping the control unit 22, thus allows one to achieve machining with different depths of pass or different machining at different points of the panel 2, according to the strength sought for the latter. This very high level of precision is rendered possible in particular by the balance of machining and retention forces applied by the tool 11 and the retention element 13 on either side of the panel 2.

In a preferred but not strictly necessary form of implementation, with a view to obtaining perfect precision, it is possible to envisage implementing telemetry resources 55, such as laser telemetry resources, to enable one to create a particularly precise cartography of the retention face $2_M$ of the panel 2 before machining the latter. This telemetry thus allows one to obtain a perfect reference, allowing one to know, with great accuracy, the depth of the panel 2 at all points of the latter after machining. In fact, the residual depth will then be determined by the distance between the end of the tool 11 and the retention element 13 and, more particularly the sphere 41, during the machining process, since this distance then corresponds to the residual depth of the panel 2 after machining.

According to another characteristic of the invention, it is also possible to envisage implementing telemetry resources 56 that enable one to measure the coordinates of the working face $2_T$ of the panel with precision. Thus, the combined use of telemetry resources 55 and 56 allows one to have total knowledge of the geometry of the panel 2 before and after machining.

Once the machining of the panel 2 has been completed, the frame 5 is unlocked to be removed and to allow the fitting of another frame.

The invention, thus constituted, therefore allows simultaneous working, and it is possible to perform the machining of different types of panel 2 by the use of different frames.

It should be noted that according to the illustrated example, the frame 5 is fitted with a cross-member 57 which is mobile in translation and allows one to adjust the effective dimensions of the frame 5, so as to allow the accommodation of panels of different dimensions with a single type of frame.

Figure 5:
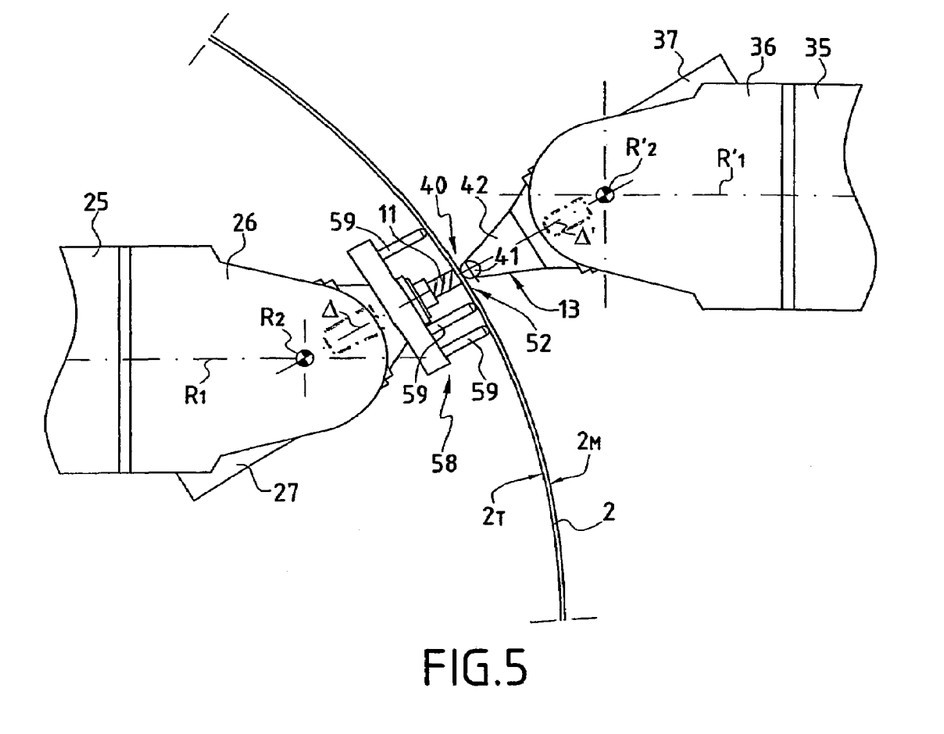
FIG. 5 is a view similar to that of FIG. 3, showing an implementation variant of the machining device of the invention.

According to the invention, it is also possible to include, in the working area 50, at least one counter-support element 58, as illustrated in FIG. 5. According to this example, the counter-support element 58 includes three telescopic, isostatic fingers 59, in continuous contact with the working face $2_T$ of the panel 2. The fingers 59 are preferably arranged in a triangle, though any other configuration can also be envisaged The fingers 59 constituting the counter-support element are used to prevent any drag phenomenon on the panel by the tool 11, and can also perform damping of machining vibrations.

In addition, according to another implementation variant of the invention, use is also made, at the tool-bearing head 27, of resources for the movement of the tool in translation along direction Δ perpendicular to axis of rotation $R_2$. Likewise, use is also made, at the element-carrying retention head 37, of resources for the movement in translation of the retention element along direction Δ', perpendicular to axis of rotation $R'_2$. Of course these movement resources in translation are associated with motor resources that are commanded by the control unit.

Such a configuration is particularly suitable to effect machining of the panel, so as to render it perfectly in accordance with the theoretical model sought.

In this case, the control unit performs control of the installation on the basis of the theoretical three-dimensional description file of the panel to be created, and then controls the operation of the different parts of the machining device to this end.

Of course the machining device of the invention can also be controlled in the context of a machining method which could be described as corrective, to the extent that, after a telemetry stage to enable one to detect the actual shape of the panel, the control unit will command the operation of the device so as to produce the shape sought from the actual shape.

Such machining operations on a panel in three dimensions are particularly favoured by the kinetics of the ends of arms 25 and 26, and of supports of tools 26 and the retention element, as illustrated in FIG. 3.

However, in certain combinations of movement, the control unit encounters difficulties in calculating the rotations along axes $R_1$, $R_2$ and $R'_1$, $R'_2$ to attain the machining and support areas.

Figure 6:
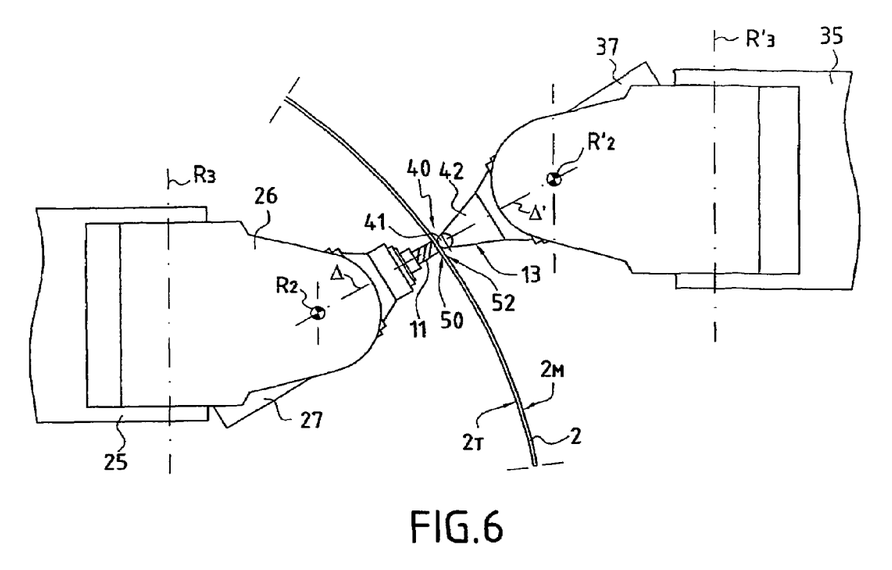
FIG. 6 is an elevation from the side of another form of implementation of the machining device of the invention.

In order to provide a solution to these difficulties of calculation and the associated control, the invention proposes, in one form of implementation, particularly such as that illustrated in FIG. 6, elimination of the rotation movements around axes R, and $R'_1$ of the head supports 26 and 36.

According to this variant, the rotation movements along $R_1$ and $R'_1$ are replaced by rotation of the head supports 26, 36 around axes, $R_3$ and $R'_3$ respectively, which are more or less vertical or contained within a vertical plane. In this configuration, axes of rotation $R_2$ and $R'_2$ are placed so as to be perpendicular to axes $R_3$ and $R'_3$ respectively. Of course the machining device includes motor resources that are commanded by the control unit and associated in rotation around axes $R_3$ and $R'_3$.

Figure 7:
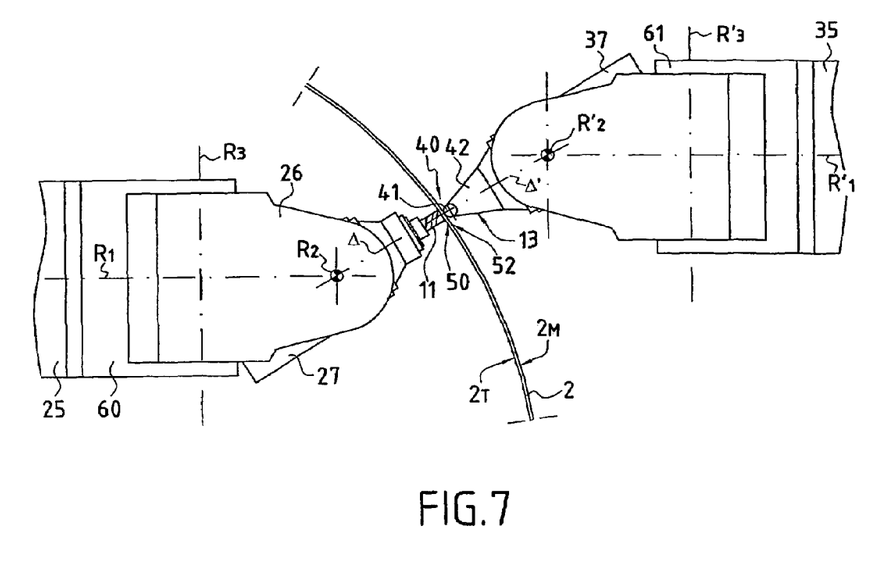
FIG. 7 is a view similar to that of FIG. 5, showing another implementation variant of the machining device.

FIG. 7 illustrates an implementation variant of the machining device, as illustrated in FIG. 6. According to this implementation variant, the rotation movements along axes $R_1$ and $R'_1$ are combined with the rotation movements along axes $R_2$, $R_3$ and $R'_2$, $R'_3$ To this end, the end of the arm 25 includes a cradle 60 which is mobile in rotation around horizontal axis $R_1$ parallel to axis Y. The head support 26 is then fitted on the cradle 60, being mobile in relation to the latter in rotation around axis $R_3$ perpendicular to axis $R_1$, while the tool-bearing head 27 is mobile in rotation in relation to the support 26 along axis $R_2$, perpendicular both to axis $R_1$ and axis $R_3$. The assembly that includes the end of the arm 35 to which the cradle 60 is fitted, the head support 26, and the tool-bearing head 27, forms what can be describes as a head assembly.

Likewise, the end of the arm 35 includes a cradle 61 which is mobile in rotation around horizontal axis $R'_1$.

The head support 36 is fitted on the cradle 61, being mobile in relation to the said cradle in rotation around axis $R'_3$, perpendicular to axis $R'_1$. Finally, the retention element-carrying head 37 is mobile in rotation in relation to the support 37 along axis $R'_2$, perpendicular to axes of rotation $R'_1$ and $R'_3$.

In this configuration, there is redundancy between axes $R_1$, $R_2$, and $R_3$ on the one hand and axes $R'_1$, $R'_2$, $R'_3$ on the other. The control unit 22 then effects control of the machining device, giving priority to the movement combinations along $R_2$, $R_3$ and $R'_2$, $R'_3$ respectively, in relation to the rotations along $R_1$, and $R'_1$ respectively.

Of course it is also possible, for the forms of implementation of FIG. 6 and 7, to provide translation movements of the tool along axis $\Delta$ and of the retention element along axis $\Delta'$.

The invention claimed is:

1. A process for the machining of a panel, including the steps of:
    positioning at least one machining tool at a working area on a face, called the machining face, of the panel,
    positioning at least one retention element at a support area located, firstly, on a face, known as the retention face, of the panel, opposite to the machining face and, secondly, opposite to the working area in relation to the panel,
    inducing a coordinated movement of the at least one machining tool and of the at least one retention element on and relative to the panel, said coordinated movement having at least one component that is tangential to the machining face of the panel to preserve the opposition of said at least one retention element on the support area and of the at least one machining tool on the working area during the coordinated movement, in order to machine at least part of the machining face, and wherein the at least one machining tool and the at least one retention element are placed in contact with the panel during the coordinated movement of the at least one machining tool in machining operation and of the at least one retention element on the panel.

2. A machining process according to claim 1, wherein the at least one retention element applies a support force to the panel in a direction $\Delta'$, perpendicular to the retention face of the support area.

3. A machining process according to claim 1, wherein at least one counter-support element is applied to the working area.

4. A machining process according to claim 1, wherein the at least one machining tool performs machining by the stripping or removal of the panel material, and is capable of a spinning movement about an axis $\Delta$.

5. A machining process according to claim 4, wherein the at least one retention element applies a force to the support area in a direction $\Delta'$, and wherein, during machining of the panel at the working area by the at least one machining tool, axes $\Delta$ and $\Delta'$ are almost coincident.

6. A machining process according to claim 1, wherein machining vibrations are damped, at least at the at least one retention element.

7. A machining process according to claim 1, wherein the at least one retention element and the at least one machining tool are each moved with at least five degrees of freedom.

8. A machining process according to claim 7, wherein the at least one retention element and the at least one machining tool are each moved with three degrees of freedom of movement in translation on axes X, Y, and Z, and X', Y', and Z' respectively and two degrees of movement in rotation about axes $R_1$ and $R_2$, and $R'_1$, $R'_2$ respectively, where the axes $R_1$, $R'_1$ are parallel to the axes Y, Y' respectively and the axes $R_2$, $R'_2$ are parallel to the planes defined by the axes X, Z, and X', Z' respectively.

9. A machining process according to claim 1, wherein the panel is placed between said at least one machining tool and said at least one retention element with a generally vertical orientation.

10. A machining process according to claim 1, wherein the panel is maintained generally immobile during the machining process.

11. A machining process according to claim 1, wherein the actual geometry of the retention face is determined before machining.

12. A machining process according to claim 1, wherein the at least one retention element secures the retention face of the panel without machining this retention face.

13. A device for the machining of at least one panel, said device comprising:
    resources to support the at least one panel, designed to allow simultaneous access to two opposite faces of the at least one panel, known as the machining and retention faces,
    resources for the movement of at least one machining tool,
    resources for the movement of at least one retention element,
    a control unit designed to actuate and control the movement resources so said at least one machining tool and said at least one retention element effect a coordinated movement on, relative to, and while in contact with both the machining face and the retention face of the at least one panel, respectively, during machining of said at least one panel by said at least one machining tool, said coordinated movement having at least one component that is tangential to the machining face of the at least one panel to preserve the opposition of support and working areas during the movement and machine at least part of the machining face of the at least one panel.

14. A device according to claim 13, wherein the movement resources of the at least one machining tool and of the at least one retention element each have at least five axes of movement to provide at least five degrees of freedom for the at least one tool and the at least one retention element.

15. A device according to claim 14, wherein the movement resources of the at least one machining tool and of the at least one retention element each include three degrees of movement in translation on axes X, Y, Z, and X', Y', Z' respectively, and two degrees of movement in rotation about axes $R_1$, $R_2$ and, $R'_1$, $R'_2$ respectively, where the axes $R_1$ and $R'_1$ are parallel to the axes Y, Y' respectively and the axes $R_2$, $R'_2$ are parallel to the planes defined by the axes X, Z, and X', Z' respectively.

16. A device according to claim 15, wherein the axes X, Z and X', Z' define generally parallel vertical planes.

17. A device according to claim 15, further comprising: movement resources in translation for the at least one tool in a direction Δ, perpendicular to the axis of rotation $R_2$, and movement resources in translation for the at least one retention element in a direction Δ', perpendicular to the axis of rotation $R'_2$.

18. A device according to claim 14, wherein:
the resources for movement of the at least one machining tool include:
   a first beam, which is mobile in translation along at least one guidance track on an axis X supported by a chassis and associated with motor resources that are commanded by the control unit,
   a first chariot, which is mobile in translation along a first guidance track on an axis Z, carried by the first beam and associated with motor resources commanded by the control unit, the axis Z being more or less perpendicular to the axis X,
   a first arm, which is telescopic in translation on an axis Y, carried by the first chariot and associated with motor resources that are commanded by the control unit the axis Y being generally perpendicular to the plane defined by the axes X, Z,
   a first head support designed to fit onto one end of the first telescopic arm, and which is mobile in rotation in relation to the first arm about an axis $R_1$ parallel to the axis Y and associated with motor resources that are commanded by the control unit,
   a tool-bearing head, designed to fit onto the first head support, which is mobile in rotation in relation to the first head support about an axis $R_2$ that is perpendicular to the axis Y, and associated with motor resources that are commanded by the control unit,
the movement resources for the at least one retention element include:
   a second beam, which is mobile in translation along at least one guidance track on an axis X' supported by the chassis and associated with motor resources that are commanded by the control unit,
   a second chariot, which is mobile in translation along a second guidance track on an axis Z' carried by the second beam and associated with motor resources that are commanded by the control unit, the axis Z' being more or less perpendicular to the axis X',
   a second arm, which is telescopic in translation, on an axis Y', carried by the second chariot and associated with motor resources that are commanded by the control unit, the axis Y'being generally perpendicular to the plane defined by the axes X', Z',
   a second head support designed to fit onto one end of the telescopic arm and which is mobile in rotation in relation to the second arm about an axis $R'_1$, parallel to the axis Y', and associated with motor resources that are commanded by the control unit,
   a retention-element-carrying head, designed to fit onto the second head support, and mobile in relation to the support in rotation about an axis $R'_2$, perpendicular to the axis Y', and associated with motor resources that are commanded by the control unit,
and wherein the support resources are fitted onto the chassis so as to be interposed between the movement resources of the at least one tool and the movement resources of the at least one retention element.

19. A device according to claim 18, wherein:
the first head support of the tool-bearing head is fitted onto a first cradle equipping the end of the first telescopic arm, which first cradle is mobile in rotation around the axis $R_1$, and which first head support is mobile in relation to the first cradle in rotation around an axis $R_3$ perpendicular to the axis $R_1$,
the second head support of the retention-element-carrying head is fitted on a second cradle equipping the end of the second telescopic arm, which second cradle is mobile in rotation around the axis $R_1$, and which second head support is mobile in relation to the second cradle in rotation around an axis $R'_3$, perpendicular to the axis $R'_1$.

20. A device according to claim 18, wherein the tool-bearing head includes resources for rotation of the at least one tool about an axis that is generally perpendicular to the axis $R_2$.

21. A device according to claim 13, wherein the movement resources of the at least one tool include at least one counter-support element on the machining face of the at least one panel.

22. A device according to claim 13, wherein the at least one retention element provides damping for machining vibrations.

23. A device according to claim 22, wherein the the at least one retention element is designed to roll during the machining process.

24. A device according to claim 13, wherein the at least one retention element includes at least one bearing sphere designed to roll on the retention face of the at least one panel during the machining process.

25. A device according to claim 24, wherein the at least one bearing sphere is made from elastically deformable material, so as to damp machining vibrations.

26. A device according to claim 13, wherein the support resources of the at least one panel are removable, and the device further includes resources for immobilization of the support resources during the machining of the at least one panel.

27. A device according to claim 26, wherein the support resources include a removable frame, equipped with resources for securing a panel to be machined.

28. A device according to claim 27, wherein the frame includes at least one mobile cross-member, allowing adjustment of the effective frame dimensions.

* * * * *